(12) United States Patent
Awazu et al.

(10) Patent No.: US 10,890,780 B2
(45) Date of Patent: *Jan. 12, 2021

(54) ANTI-VIBRATION DEVICE AND BINOCLE

(71) Applicant: FUJIFILM Corporation, Tokyo (JP)

(72) Inventors: Kouhei Awazu, Saitama (JP); Akimasa Kaya, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 270 days.

This patent is subject to a terminal disclaimer.

(21) Appl. No.: 16/016,003

(22) Filed: Jun. 22, 2018

(65) Prior Publication Data

US 2018/0299691 A1 Oct. 18, 2018

Related U.S. Application Data

(63) Continuation of application No. PCT/JP2016/084471, filed on Nov. 21, 2016.

(30) Foreign Application Priority Data

Dec. 25, 2015 (JP) .................................. 2015-253275

(51) Int. Cl.
*G02B 27/64* (2006.01)
*G02B 23/18* (2006.01)
(Continued)

(52) U.S. Cl.
CPC ........... *G02B 27/646* (2013.01); *G02B 23/02* (2013.01); *G02B 23/18* (2013.01); *H02K 41/0356* (2013.01)

(58) Field of Classification Search
CPC ...... G02B 27/64; G02B 27/646; G02B 15/14; G02B 23/02; G02B 23/18; G02B 7/06;
(Continued)

(56) References Cited

U.S. PATENT DOCUMENTS 3,468,595 A * 9/1969 Humphrey ............. G03B 17/17
359/556
6,130,993 A 10/2000 Hayakawa
(Continued)

FOREIGN PATENT DOCUMENTS

JP 6-250098 A 9/1994
JP 10-333201 A 12/1998
(Continued)

OTHER PUBLICATIONS

International Preliminary Report on Patentability and Written Opinion of the International Searching Authority (Forms PCT/IB/326, PCT/IB/373 and PCT/ISA/237) for Application No. PCT/JP2016/084471, dated Jul. 5, 2018, with an English translation of the Written Opinion.
(Continued)

*Primary Examiner* — Jie Lei
(74) *Attorney, Agent, or Firm* — Birch, Stewart, Kolasch & Birch, LLP

(57) ABSTRACT

An anti-vibration device includes first reflective members, second reflective members, barrels, a first link member, and a second link member. The barrels each hold the first reflective member and the second reflective member. The first link member connects the pair of left and right barrels with each other, and rotates the barrels. The second link member engages with the pair of left and right second reflective members, and rotates the second reflective members. In a case where the barrel is viewed in a direction parallel to a second rotational axis, at least a part of the first link member and the second link member is disposed in a triangle region on a rear side of the second reflective member.

8 Claims, 15 Drawing Sheets

(51) Int. Cl.
*G02B 23/02* (2006.01)
*H02K 41/035* (2006.01)

(58) Field of Classification Search
CPC .............. G03B 5/00; G03B 2205/0007; H02K 41/0356
USPC ....... 359/404, 405, 407, 410, 419, 646, 683; 396/52, 55, 89
See application file for complete search history.

(56) References Cited

U.S. PATENT DOCUMENTS

| | | | | |
|---|---|---|---|---|
| 2014/0368905 | A1* | 12/2014 | Arai | G02B 17/026 359/399 |
| 2018/0299690 | A1* | 10/2018 | Kaya | G02B 23/18 |
| 2018/0364443 | A1* | 12/2018 | Awazu | G02B 7/06 |
| 2018/0364495 | A1* | 12/2018 | Awazu | G02B 23/18 |

FOREIGN PATENT DOCUMENTS

| | | |
|---|---|---|
| JP | 11-295774 A | 10/1999 |
| JP | 11-305276 A | 11/1999 |

OTHER PUBLICATIONS

International Search Report and English translation (Form PCT/ISA/210) for Application No. PCT/JP2016/084471, dated Feb. 14, 2017.

\* cited by examiner

ANTI-VIBRATION DEVICE AND BINOCLE

CROSS-REFERENCE TO RELATED APPLICATIONS

This application is a Continuation of PCT International Application No. PCT/JP2016/084471 filed on 21 Nov. 2016, which claims priority under 35 U.S.C § 119(a) to Japanese Patent Application No. 2015-253275 filed on 25 Dec. 2015. The above application is hereby expressly incorporated by reference, in its entirety, into the present application.

BACKGROUND OF THE INVENTION

1. Field of the Invention

The present invention relates to an anti-vibration device and a binocle which prevent image blurring of an optical image.

2. Description of the Related Art

As an optical observation device for observing an optical image of a distant view in an enlarged manner, there are binocles each having a pair of telephoto optical systems disposed in a left-right direction. Further, in order to prevent image blurring of an optical image from being caused by vibration such as hand shaking, optical observation devices each comprising an anti-vibration device that corrects image blurring of the optical image have been known.

Some anti-vibration device of the optical observation devices may correct image blurring by driving an erecting prism provided in a telephoto optical system, or may correct image blurring by driving a plurality of reflection mirrors. The anti-vibration device that drives the reflection mirrors is characterized by being light and being low cost compared to the anti-vibration device that drives the erecting prism.

JP1998-333201A (JP-H10-333201A) describes an optical observation device in which an anti-vibration device including first to fourth reflective members is disposed between objective optical systems and ocular optical systems constituting telephoto optical systems. The first to fourth reflective members are formed of reflection mirrors. The anti-vibration device of JP1998-333201 A (JP-H10-333201A) forms a second optical axis by deflecting a first optical axis of the objective optical system through a first reflective member, forms a third optical axis by deflecting the second optical axis through a second reflective member, forms a fourth optical axis by deflecting the third optical axis through the third reflective member, and forms a fifth optical axis, along which light is incident onto the ocular optical system, by deflecting the fourth optical axis through a fourth reflective member. The second reflective member and the third reflective member are formed as movable reflective members which are rotatable. With such a configuration, by separately rotating the second reflective member and the third reflective member respectively around two rotational axes orthogonal to each other, it is possible to correct image blurring in a pitch direction and a yaw direction.

SUMMARY OF THE INVENTION

The anti-vibration device is built into the optical observation device, and therefore it is preferable that the anti-vibration device has a small size and a light weight in order to secure a storage space, increase a response speed, or improve portability. However, in the anti-vibration device of JP1998-333201A (JP-H10-333201A), since the rotational axis of the second reflective member for correcting image blurring is disposed in parallel with the upper-lower direction and a driving actuator is connected to the rotational axis, a size thereof in the upper-lower direction is not reduced.

In order to solve the problems, an object of the present invention is to provide an anti-vibration device and a binocle which are capable of reducing a size by suppressing a dimension in an upper-lower direction.

In order to achieve the object, there is provided an anti-vibration device that is disposed between a pair of left and right objective optical systems of which optical axes are disposed in parallel with each other and a pair of left and right ocular optical systems of which optical axes are disposed in parallel with each other. The objective optical systems and the ocular optical systems constitute a pair of left and right telephoto optical systems. The anti-vibration device includes a pair of left and right first reflective members, a pair of left and right second reflective members, a pair of left and right holding members, a first link member, a first actuator, a second link member, and a second actuator. In a case where the holding member is viewed in a direction parallel to a second rotational axis, at least a part of the first and second link member is disposed in a triangle region surrounded by the first reflective member, an upper end surface passing through an upper end of the first reflective member in an upper-lower direction, and a rear end surface passing through a rear end of the first reflective member in a front-back direction or a triangle region surrounded by the second reflective member, a lower end surface passing through a lower end of the second reflective member in the upper-lower direction, and a front end surface passing through a front end of the second reflective member in the front-back direction. The upper-lower direction is a direction parallel to the second optical axis. The front-back direction is a direction parallel to the first and third optical axes. The pair of left and right first reflective members are disposed so as to be respectively inclined with respect to the first optical axes of the objective optical systems, and the second optical axes are formed by deflecting the first optical axes of the pair of left and right objective optical systems. The pair of left and right second reflective member is disposed to be respectively inclined with respect to the second optical axes and forms third optical axes parallel to the first optical axes by deflecting the second optical axes. The pair of left and right holding members each holds the first reflective member and the second reflective member, and is disposed so as to be respectively rotated around first rotational axes concentric with the second optical axes. The pair of left and right holding members each holds one of the first reflective member and the second reflective member in a fixed state, and each holds the other one so as to be rotated around a second rotational axis perpendicular to a plane formed by the first optical axis and the second optical axis. The first link member aligns the pair of left and right holding member in a state in which the first optical axes are held in parallel with each other, and rotates the holding members around the first rotational axes. The first actuator moves the first link member in an arrangement direction of the holding members. The second link member is held by the first link member so as to be rotated around a third rotational axis parallel to the second rotational axis, engages with the pair of left and right other reflective members, and rotates the other reflective members. The second actuator rotates the second link member around the third rotational axis.

It is preferable that at least one of the first actuator or the second actuator is disposed so as to be close to any one side in the upper-lower direction. It is preferable that the first actuator and the second actuator are positioned in a middle region between the pair of left and right telephoto optical systems.

It is preferable that the second link member rotates the pair of left and right second reflective members.

It is preferable that the anti-vibration device further comprises a battery that serves as a power supply of the first actuator and the second actuator and the battery is positioned in a middle region between the pair of left and right telephoto optical systems.

It is preferable that the first actuator and the second actuator are voice coil motors each having a magnet and a coil and the coil of the first actuator is fixed to the first link member and the coil of the second actuator is fixed to the second link member.

A binocle of the present invention comprises objective optical systems each having a positive composite focal length, ocular optical systems, and the anti-vibration device provided between the objective optical systems and the ocular optical systems.

It is preferable that the ocular optical systems each have a positive composite focal length and erecting optical systems that invert an optical image in vertical and horizontal directions are provided between the anti-vibration device and the ocular optical systems.

According to the present invention, it is possible to reduce sizes of an anti-vibration device and a binocle having the same by suppressing a dimension in an upper-lower direction.

DESCRIPTION OF THE PREFERRED EMBODIMENTS

Figure 1:
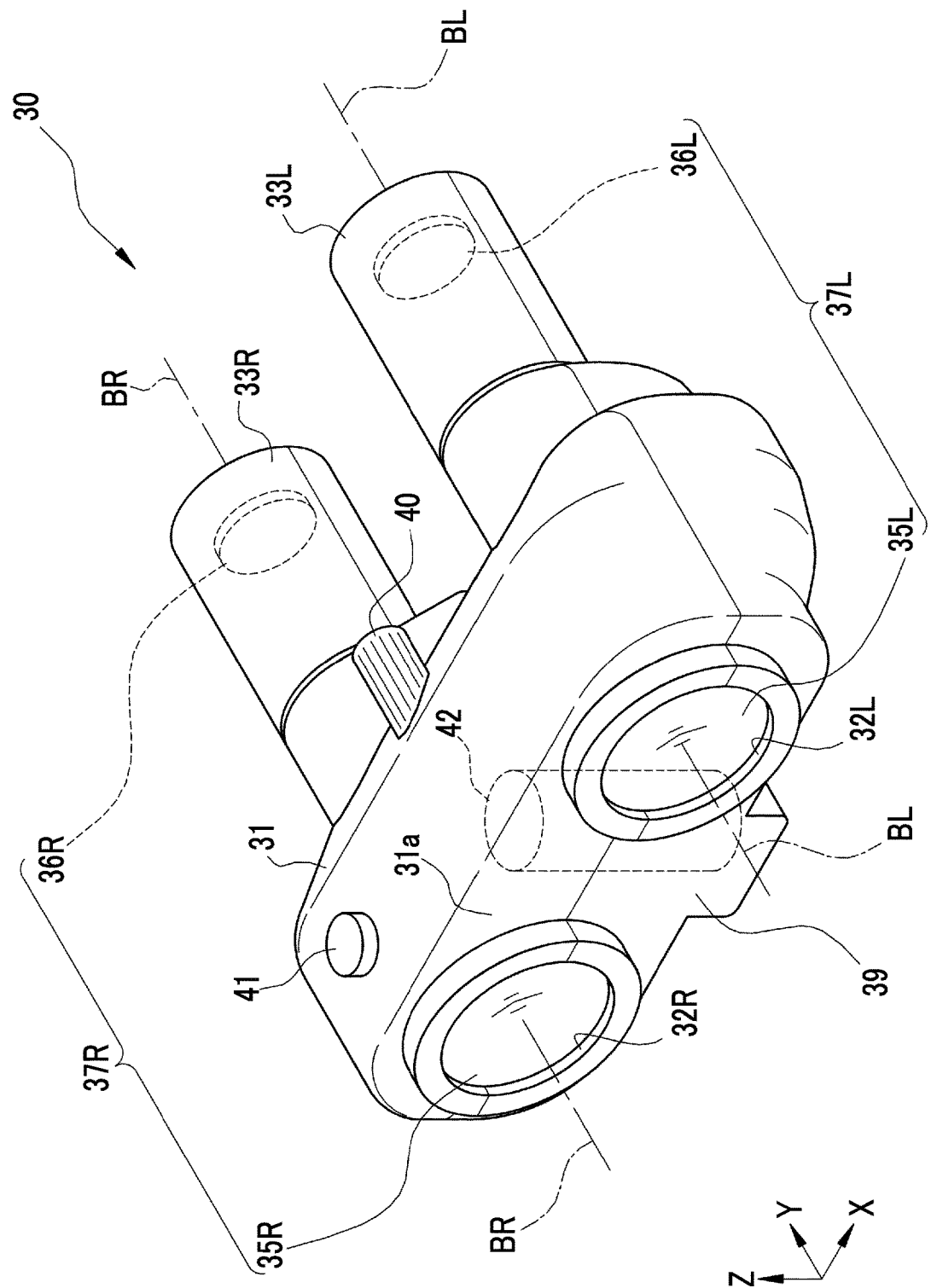
FIG. 1 is a perspective view illustrating an appearance of a binocle.

As shown in FIG. 1, a binocle 30 of the present embodiment is an optical observation device that is used to observe an optical image of a distant view in an enlarged manner through a pair of left telephoto optical system 37L and right telephoto optical system 37R which are constituted by telephoto optical systems. An anti-vibration device 45 to be described below is provided on the binocle 30. Assuming that a front-back direction of the binocle 30 is a Y axis, a width direction orthogonal to the front-back direction is an X axis, and a vertical axis perpendicular to the Y axis and the X axis is a Z axis, the anti-vibration device 45 corrects image blurring in a pitch direction around the X axis and image blurring in a yaw direction around the Z axis.

The binocle 30 includes a main body portion 31, and a pair of left eyepiece portion 33L and right eyepiece portion 33R. A pair of left objective opening 32L and right objective opening 32R is provided on a front surface 31a of the main body portion 31. The left eyepiece portion 33L and the right eyepiece portion 33R are provided on a rear side of the main body portion 31. Through the binocle 30, an enlarged image of an observation target can be observed by orienting the left objective opening 32L and the right objective opening 32R toward the observation target and viewing the observation target through the left eyepiece portion 33L and the right eyepiece portion 33R with both eyes in a state where the main body portion 31 is gripped.

Inside the left objective opening 32L and the right objective opening 32R, a left objective optical system 35L and a right objective optical system 35R are provided. The left objective optical system 35L and the right objective optical system 35R are disposed such that a pair of left and right optical axes thereof is in parallel with each other.

Inside the left eyepiece portion 33L and the right eyepiece portion 33R, a left ocular optical system 36L and a right ocular optical system 36R are provided. The left ocular optical system 36L and the right ocular optical system 36R are disposed such that a pair of left and right optical axes thereof is in parallel with each other. The left objective optical system 35L, the right objective optical system 35R, the left ocular optical system 36L, and the right ocular optical system 36R each are composed of a lens having a positive composite focal length.

The left objective optical system 35L and the left ocular optical system 36L are disposed on a left-eye optical axis BL which is set along the front-back direction (Y axis direction) of the binocle 30, and constitute the left telephoto optical system 37L. Further, the right objective optical system 35R and the right ocular optical system 36R are disposed on a right-eye optical axis BR which is set in parallel to the left-eye optical axis BL in the width direction (X axis direction) orthogonal to the front-back direction of the binocle 30, and constitute the right telephoto optical system 37R. Hereinafter, it is assumed that an objective side is referred to as a front side or a front end and an ocular side is referred to a rear side or a rear end in the Y axis direction.

A battery housing portion 39 is provided on the rear side of the front surface 31a of the main body portion 31. The battery housing portion 39 houses a battery 42 (see FIG. 2) that serves as a power supply of a first actuator 56, a second actuator 57 (see FIG. 4), and an anti-vibration control circuit 86 (see FIG. 14) to be described below. The battery 42 has a cylindrical shape. Further, an adjusting knob 40, which is rotated in a case where focus adjustment is performed, is provided on an upper portion on the rear side of the main body portion 31. A push-button-type power switch 41 is provided on a right side of an upper surface of the main body portion 31. The power switch 41 is pressed, and thus, the anti-vibration control circuit 86 is operated.

Figure 2:
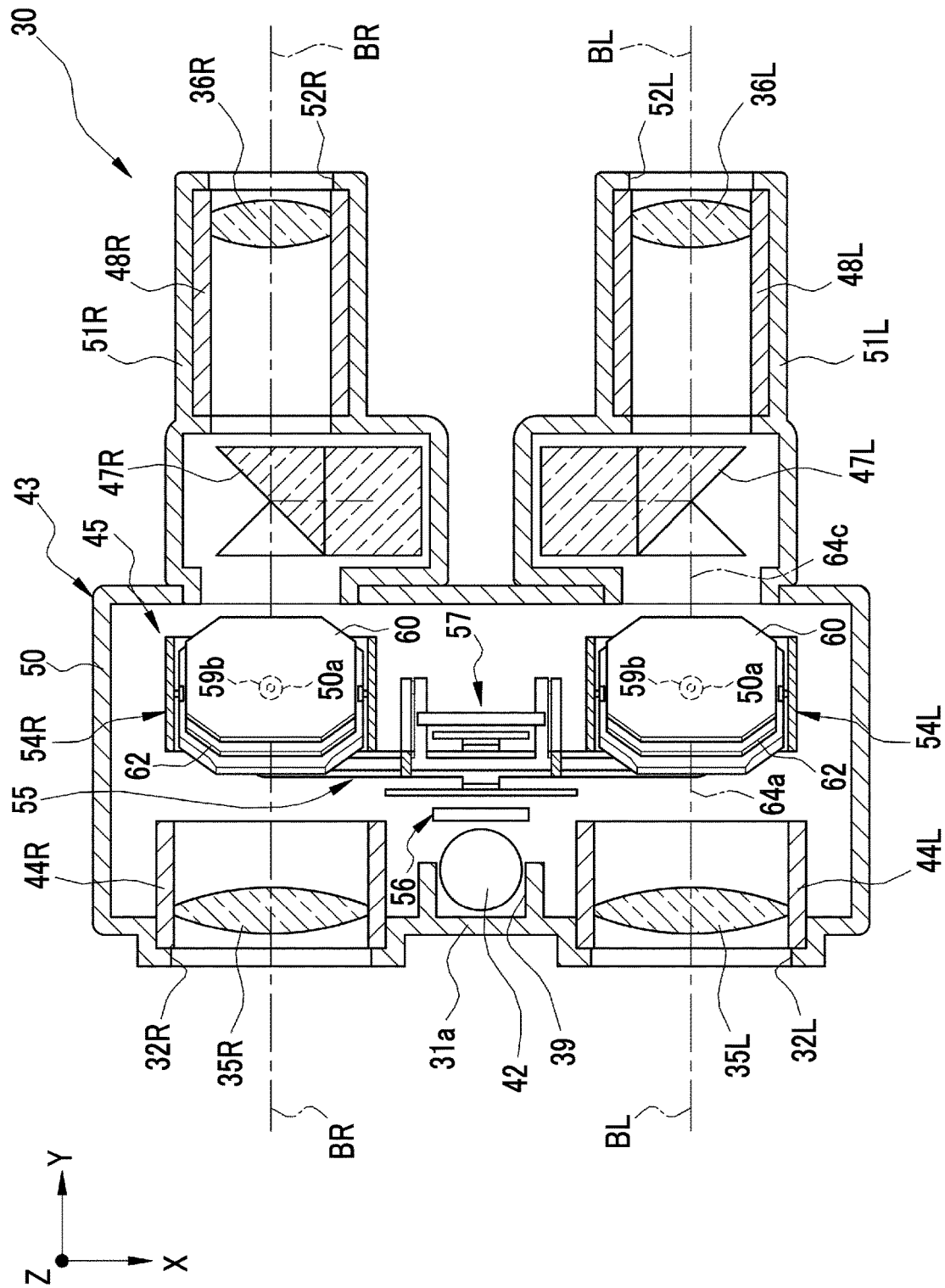
FIG. 2 is a horizontal cross section view of the binocle.
Figure 3:
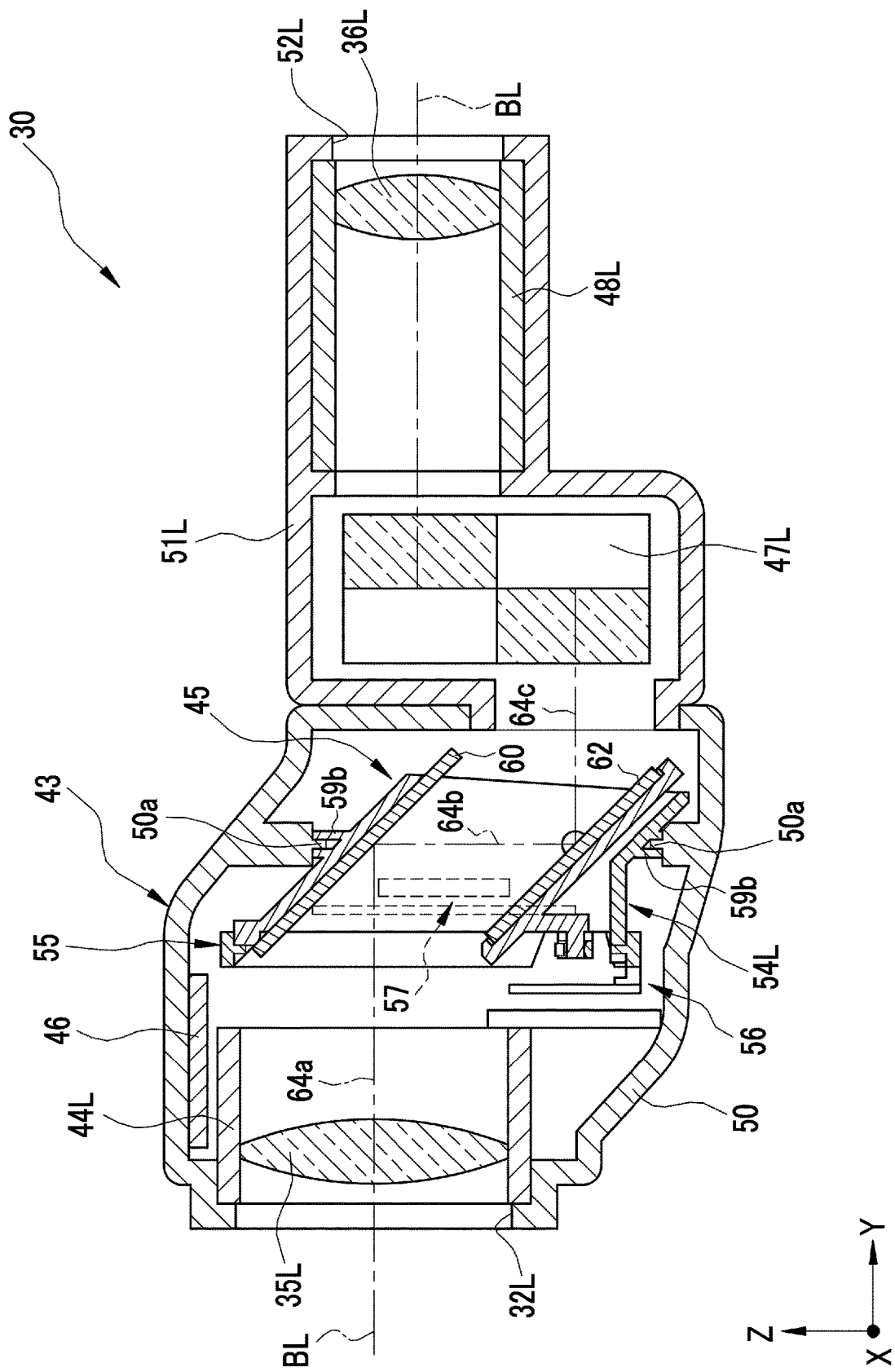
FIG. 3 is a vertical cross section view taken along a left-eye optical axis of the binocle.

FIG. 2 shows a horizontal cross section of the binocle 30, and FIG. 3 shows a vertical cross section taken along the left-eye optical axis BL. As shown in FIGS. 2 and 3, the binocle 30 comprises a casing 43, a left objective barrel 44L, a right objective barrel 44R, an anti-vibration device 45, a control substrate 46, a left erecting optical system 47L, a right erecting optical system 47R, a left eyepiece barrel 48L, and a right eyepiece barrel 48R. The anti-vibration device 45 including an anti-vibration optical system, the left erecting optical system 47L, and the right erecting optical system 47R constitute the left telephoto optical system 37L and the right telephoto optical system 37R.

The casing 43 comprises a casing main body 50, a left eyepiece casing 51L, and a right eyepiece casing 51R. The casing main body 50 is an exterior of the main body portion 31. The left eyepiece casing 51L is an exterior of the left eyepiece portion 33L. The right eyepiece casing 51R is an exterior of the right eyepiece portion 33R. The main body casing 53 houses the left objective barrel 44L, the right objective barrel 44R, the anti-vibration device 45, and the control substrate 46. The left eyepiece casing 51L houses the left erecting optical system 47L and the left eyepiece barrel 48L. Further, the right eyepiece casing 51R houses the right erecting optical system 47R and the right eyepiece barrel 48R.

In the left eyepiece casing 51L and the right eyepiece casing 51R, a left eyepiece opening 52L and a right eyepiece opening 52R are respectively provided to expose the left ocular optical system 36L and the right ocular optical system 36R to the outside. Further, the left eyepiece casing 51L and the right eyepiece casing 51R are fit into the casing main body 50 so as to be rotatable respectively around the left-eye optical axis BL and the right-eye optical axis BR. Accordingly, it is possible to adjust the left ocular optical system 36L and the right ocular optical system 36R in accordance with spacing between both eyes of a binocle user.

The left objective barrel 44L and the right objective barrel 44R have cylinder shapes, and the left objective optical system 35L and the right objective optical system 35R are respectively housed therein. The left objective barrel 44L and the right objective barrel 44R are held movably in the optical axis direction through a holding mechanism which is not shown. The holding mechanism moves the left objective barrel 44L and the right objective barrel 44R in the optical axis direction through a rotation operation of the adjusting knob 40.

Figure 4:
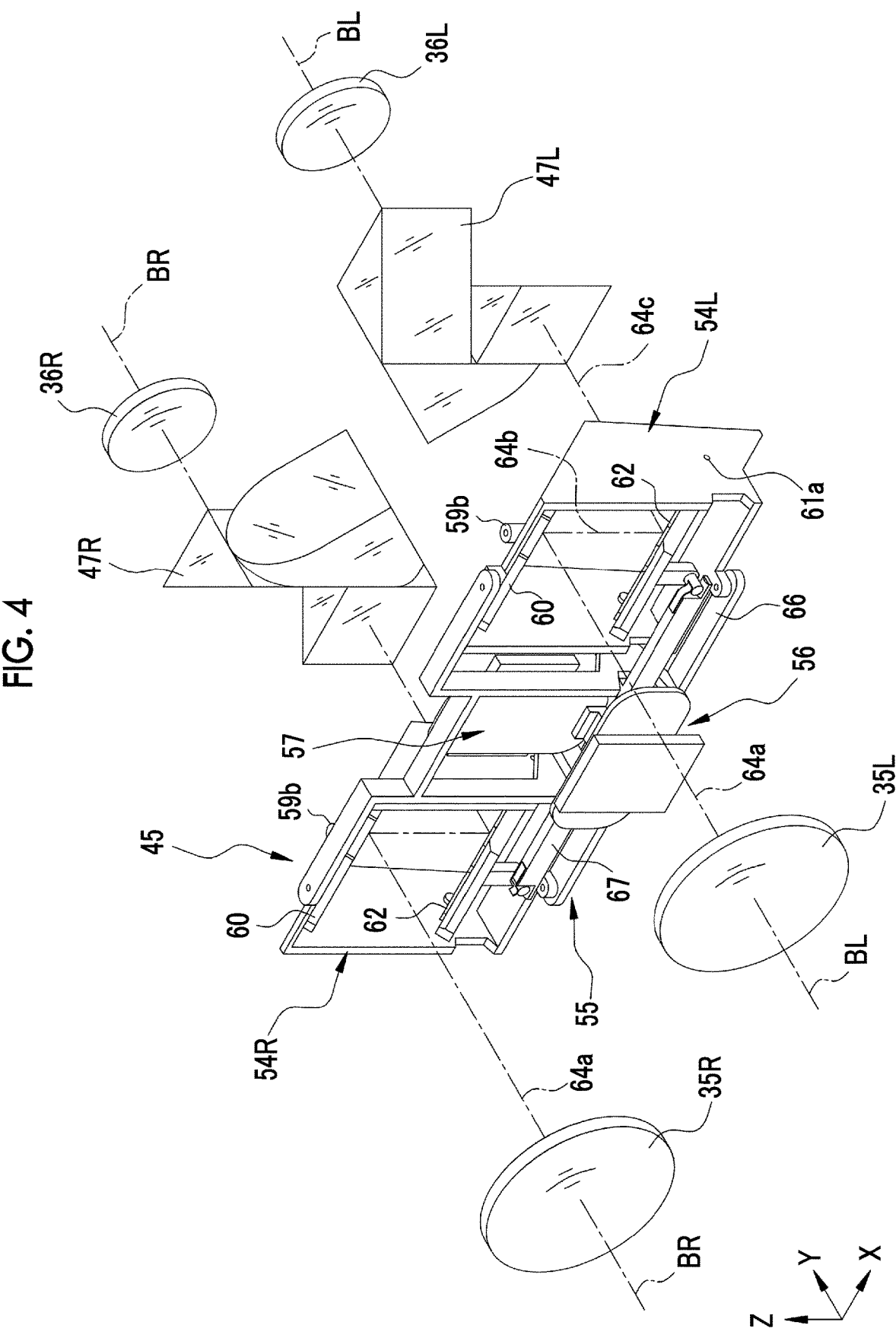
FIG. 4 is a perspective view illustrating a configuration of an anti-vibration device.

The anti-vibration device 45 is a device for correcting image blurring, which is caused by hand shaking and the like, on an optical image. The anti-vibration device 45 is disposed between the left and right objective optical systems 35L and 35R and the left and right ocular optical systems 36L and 36R. As shown in FIG. 4, the anti-vibration device 45 comprises a left anti-vibration unit 54L, a right anti-vibration unit 54R, a link mechanism 55, a first actuator 56, and a second actuator 57.

The left anti-vibration unit 54L is a mechanism for correcting image blurring in the left telephoto optical system 37L. The left anti-vibration unit 54L is disposed between the left objective optical system 35L and the left ocular optical system 36L, and constitutes a part of the left telephoto optical system 37L. Further, the right anti-vibration unit 54R is a mechanism for correcting image blurring in the right telephoto optical system 37R. The right anti-vibration unit 54R is disposed between the right objective optical system 35R and the right ocular optical system 36R, and constitutes a part of the right telephoto optical system 37R.

The link mechanism 55 is a mechanism that links the left anti-vibration unit 54L and the right anti-vibration unit 54R with each other and that causes the left anti-vibration unit 54L and the right anti-vibration unit 54R to perform the same operations at the time of image blur correction. The first actuator 56 and the second actuator 57 are disposed between the left anti-vibration unit 54L and the right anti-vibration unit 54R, and operate the left anti-vibration unit 54L and the right anti-vibration unit 54R by driving the link mechanism 55. By using the link mechanism 55, it is possible to simplify control of an actuator, and it is possible to reduce a size and costs thereof.

The left erecting optical system 47L and the right erecting optical system 47R are optical systems that invert the optical image, in which image blurring is corrected through the anti-vibration device 45, in vertical and horizontal directions, and that causes light to be incident into the left ocular optical system 36L and the right ocular optical system 36R. In each of the left erecting optical system 47L and the right erecting optical system 47R, an erecting prism such as a Porro prism or a roof prism is used.

The left eyepiece barrel 48L and the right eyepiece barrel 48R have cylinder shapes, and the left ocular optical system 36L and the right ocular optical system 36R are respectively housed therein. In addition, for the sake of simplicity of drawings, the left objective optical system 35L, the right objective optical system 35R, the left ocular optical system 36L, and the right ocular optical system 36R each are shown as a single lens, but may be composed of a plurality of lenses.

Figure 5:
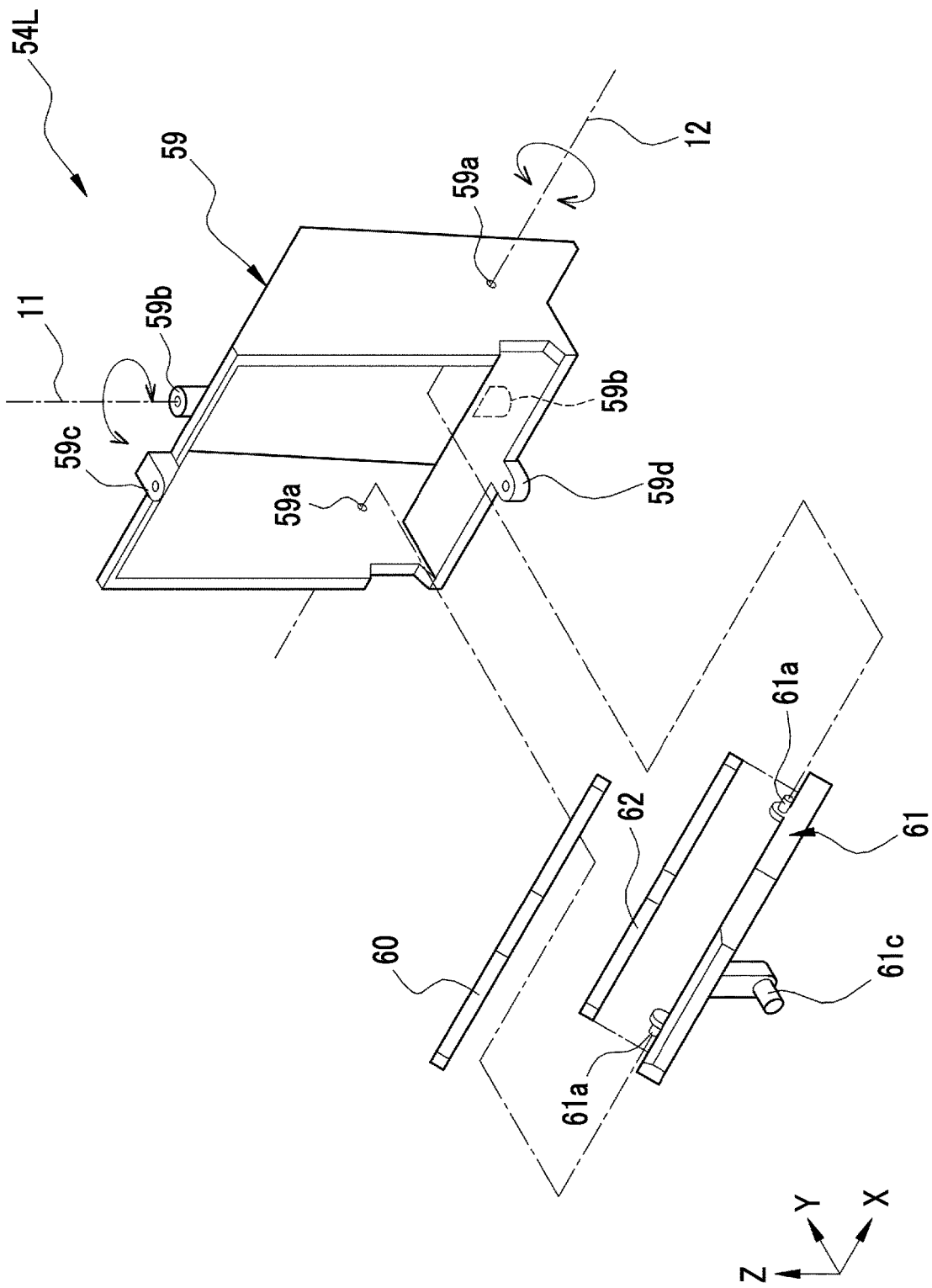
FIG. 5 is an exploded perspective view of a left anti-vibration unit including the anti-vibration optical system.

As shown in FIG. 5, the left anti-vibration unit 54L comprises a barrel 59, a first reflective member 60, a holding plate 61, and a second reflective member 62. The barrel 59 has a box shape of which a front side and a rear side are opened. The first reflective member 60 is fixed in the barrel 59. The holding plate 61 is rotatably supported in the barrel 59. The second reflective member 62 is fixed onto an upper surface of the holding plate 61. In each of the first reflective member 60 and the second reflective member 62, for example, a surface-reflection-type reflection mirror is used. The barrel 59 corresponds to a holding member of the present invention.

The first reflective member 60 is inserted in the barrel 59, and is fixed onto an upper surface of an inner wall of the barrel 59 through an adhesive or the like such that a reflective surface thereof is oriented downward. As shown in FIG. 3, the upper surface of the inner wall of the barrel 59 viewed from the X axis direction is inclined at an angle of 45° with respect to a first optical axis 64a which is an optical axis of the left objective optical system 35L. Accordingly, the first reflective member 60 is also held at an angle of 45° with respect to the first optical axis 64a.

Referring back to FIG. 5, the holding plate 61 is a rectangular-plate-like member. The second reflective member 62 is fixed onto the upper surface of the holding plate 61 through an adhesive or the like such that the reflective surface thereof is oriented upward. A pair of rotation pins 61a is provided on both side surfaces of the holding plate 61. The pair of rotation pins 61a is inserted into a pair of bearing holes 59a which is formed in both side surfaces of the barrel 59 in a case where the holding plate 61 is inserted into the barrel 59. Thereby, the holding plate 61 and the second reflective member 62 are rotatably held in the barrel 59. The pair of rotation pins 61a supported by the pair of bearing holes 59a constitutes a second rotational axis 12 of the present invention.

A bracket 61b, which protrudes downward, is provided on a lower surface of the holding plate 61. A connecting pin 61c, which protrudes in the Y axis direction, is provided on a distal end of the bracket 61b. The holding plate 61 is rotated by the link mechanism 55 with the connecting pin 61c interposed therebetween. In addition, in a state (neutral state: states of FIGS. 4 and 9) in which vibration does not occur on the binocle 30, an angle of the holding plate 61 is held by the link mechanism 55 such that the second reflective member 62 is parallel to the first reflective member 60.

As shown in FIGS. 3 and 5, a pair of bearing bosses 59b is provided on the same Z axis of an upper surface and a lower surface of the barrel 59. The bearing bosses 59b are rotatably supported by the pair of bearing pins 50a (see FIG. 3) vertically provided on an upper surface and a lower surface of an inner wall of the casing main body 50 (see FIG. 3). Thereby, the first reflective member 60 and second reflective member 62 held by the barrel 59 are integrally rotatable around the Z axis. The bearing pins 50a supported by the pair of bearing bosses 59b function as a first rotational axis 11 of the present invention. Further, a pair of upper connection boss 59c and lower connection boss 59d is provided on the same Z axis on upper and lower portions of the front side of the barrel 59. The pair of upper connection boss 59c and lower connection boss 59d are used for connection with the link mechanism 55.

The first reflective member 60 deflects the first optical axis 64a of the left objective optical system 35L through reflection, and thereby forms a second optical axis 64b which is at a right angle with respect to the first optical axis 64a. The second optical axis 64b is parallel to the Z axis direction. The second reflective member 62 deflects the second optical axis 64b through reflection, and thereby forms a third optical axis 64c which is parallel to the first optical axis 64a. The first optical axis 64a and the third optical axis 64c are parallel to the Y axis direction.

Each rotation pin 61a of the holding plate 61 is on a second rotational axis 12 that passes through an intersection between the second optical axis 64b and a reflective surface of the second reflective member 62 and is perpendicular to a plane formed by the first optical axis 64a and the second optical axis 64b. Consequently, by rotating the second reflective member 62 around the rotation pins 61a, a deflection direction of the third optical axis 64c is changed. As a result, it is possible to correct image blurring in the pitch direction.

The bearing bosses 59b of the barrel 59 are concentrically provided with the second optical axis 64b such that center axes thereof match each other, and functions as the first rotational axis 11. Accordingly, by integrally rotating the first reflective member 60 and the second reflective member 62 around the bearing bosses 59b, the deflection direction of the third optical axis 64c is changed. As a result, it is possible to correct image blurring in the yaw direction. The first rotational axis 11 is on a plane including the first optical axis 64a and the third optical axis 64c, and crosses the first optical axis 64a or the third optical axis 64c.

In addition, the right anti-vibration unit 54R has the same configuration as the left anti-vibration unit 54L, and is supported by the casing main body 50 so as to be rotatable around the Z axis in a manner similar to that of the left anti-vibration unit 54L. Further, the right anti-vibration unit 54R is connected to the link mechanism 55, with the same structure as the left anti-vibration unit 54L. Accordingly, a detailed description of the right anti-vibration unit 54R will be omitted.

Figure 6:
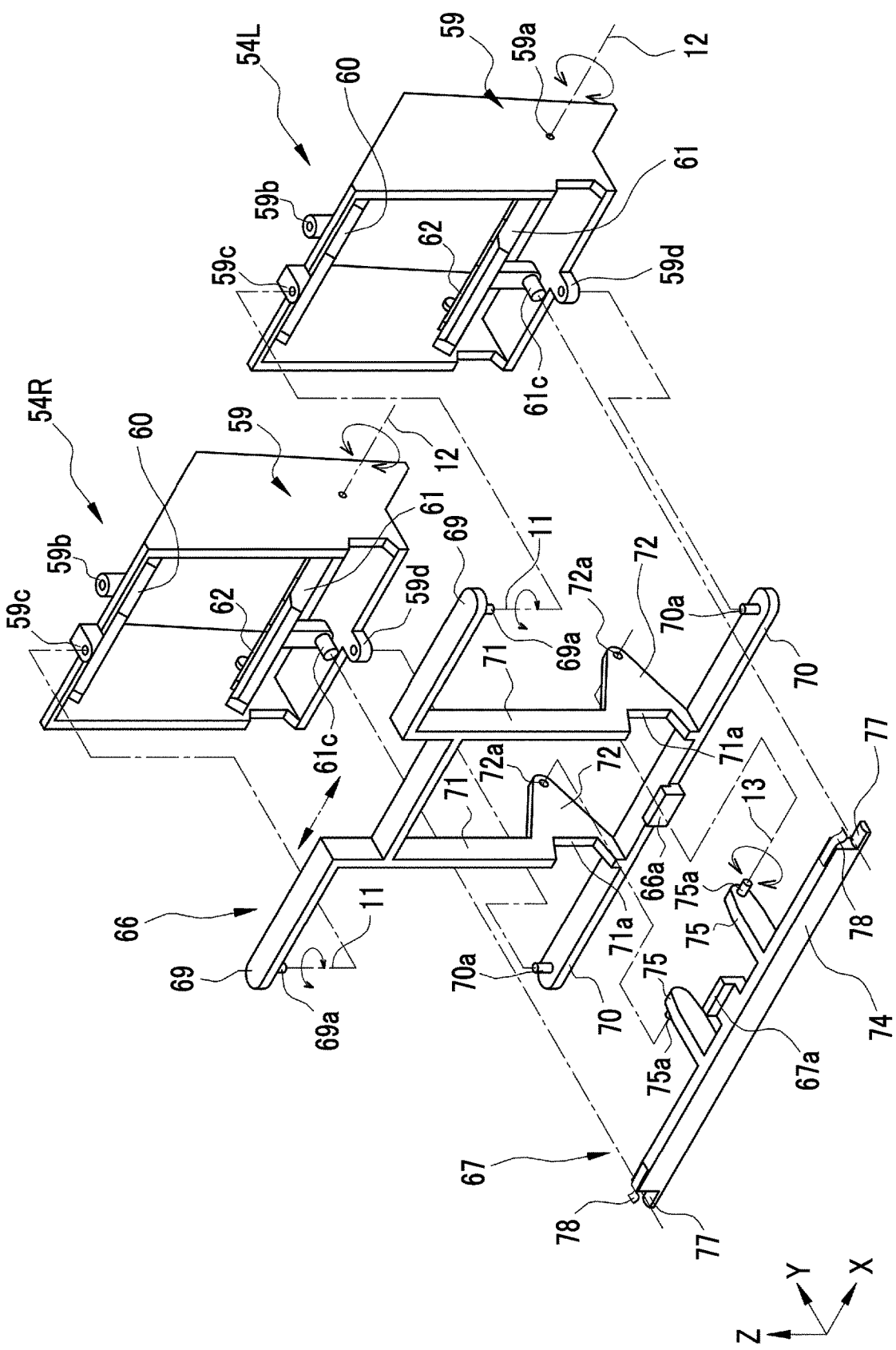
FIG. 6 is an exploded perspective view of a link mechanism.

As shown in FIG. 6, the link mechanism 55 comprises a first link member 66 and a second link member 67. The first link member 66 links the barrels 59 of the left anti-vibration unit 54L and the right anti-vibration unit 54R with each other. The pair of left and right barrels 59 linked by the first link member 66 are disposed in a state in which the first optical axes 64a are held in parallel with each other.

The pair of left and right barrels 59 is linked by the first link member 66, and thus, a barrel top plate having the bearing boss 59b and the upper connection boss 59c of the barrel 59 and a barrel lower plate having the bearing boss 59b and the lower connection boss 59d of the barrel 59 function as intermediate links. A four-joint link portion that horizontally moves the first link member 66 in the X axis direction is constituted by the intermediate links.

The second link member 67 links the pair of left and right second reflective members 62 held by the left anti-vibration unit 54L and the right anti-vibration unit 54R with each other. The second link member 67 is rotatably supported by the first link member 66.

The first link member 66 comprises first brackets 69, second brackets 70, and a pair of connecting portions 71. A pair of left and right connecting pins 69a, which is inserted into the upper connection bosses 59c of the barrels 59, is provided on lower surfaces of the first brackets 69. A pair of connecting pins 70a, which is inserted into the lower connection bosses 59d of the barrels 59, on the left and right sides is provided on upper surfaces of the second brackets 70. The pair of connecting portions 71 is vertically disposed such that the first brackets 69 and the second brackets 70 are integrally formed.

A pair of left and right third brackets 72 is provided on the pair of connecting portions 71 between the barrels 59. The third brackets 72 protrude toward the ocular optical systems 36L and 36R in the Y axis direction. Connection holes 72a are respectively formed in the third brackets 72 on the same X axis. Further, notches 71a are respectively provided in the pair of connecting portions 71 on a side opposite to a side on which the third brackets 72 are provided. The second link member 67 is accommodated within the notches 71a.

The second link member 67 comprises a stick-like link main body 74 and a pair of left and right connecting arms 75. The link main body 74 is provided along the X axis direction. The pair of left and right connecting arms 75 is provided on the link main body 74 between the barrels 59. The connecting arms 75 protrude toward the ocular optical systems 36L and 36R in the Y axis direction. The connecting arms 75 are provided inside the third brackets 72 near the third brackets 72.

Connecting pins 75a are provided on side surfaces of the connecting arms 75. The connecting pins 75a are inserted into the connection holes 72a formed in the third brackets 72 of the first link member 66. The connecting pins 75a supported by the connection holes 72a constitute a third rotational axis 13 (see FIG. 13). The second link member 67 links the third brackets 72 with the connecting arms 75 by using the third rotational axis 13, and is supported by the first link member 66 so as to be rotatable around the third rotational axis 13.

Figure 7:
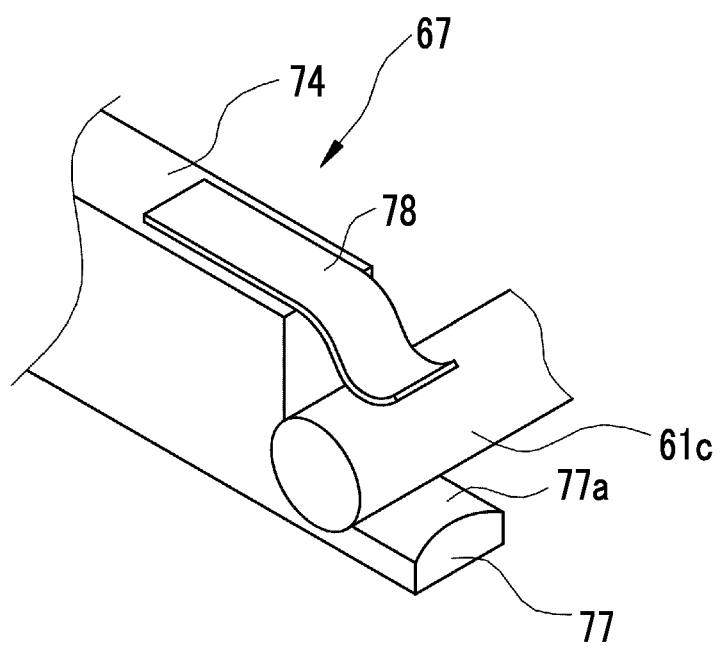
FIG. 7 is a perspective view illustrating a shape of an end portion of a second link member.

Abutment portions 77 are respectively formed on both ends of the link main body 74. The abutment portions 77 abut onto the connecting pins 61c of the holding plate 61. As shown in FIG. 7, an abutment surface 77a of the abutment portion 77 is formed as a circumferential surface. The abutment surface 77a and the connecting pin 61c are in contact with each other by the circumferential surface, and thus, the abutment portion 77 and the connecting pin 61c are in contact with each other through point contact even though the second link member 67 is rotated. Accordingly, a distance between the centers thereof is not changed. Therefore, the rotation of the second link member can be smoothly transferred to the connecting pins.

A pair of urging members 78 is attached to both ends of the link main body 74. The urging members 78 urge the connecting pins 61c of the holding plates 61 such that the connecting pins abut on the abutment portions 77. As the urging members 78, for example, leaf springs made of metal plates or torsion springs are used. The urging members 78 urge the connecting pins 61c, and thus, the abutment portions 77 abut on the connecting pins 61c. As a result, the link main body 74 engages with the pair of left and right second reflective members 62 through the holding plates 61.

Figure 8:
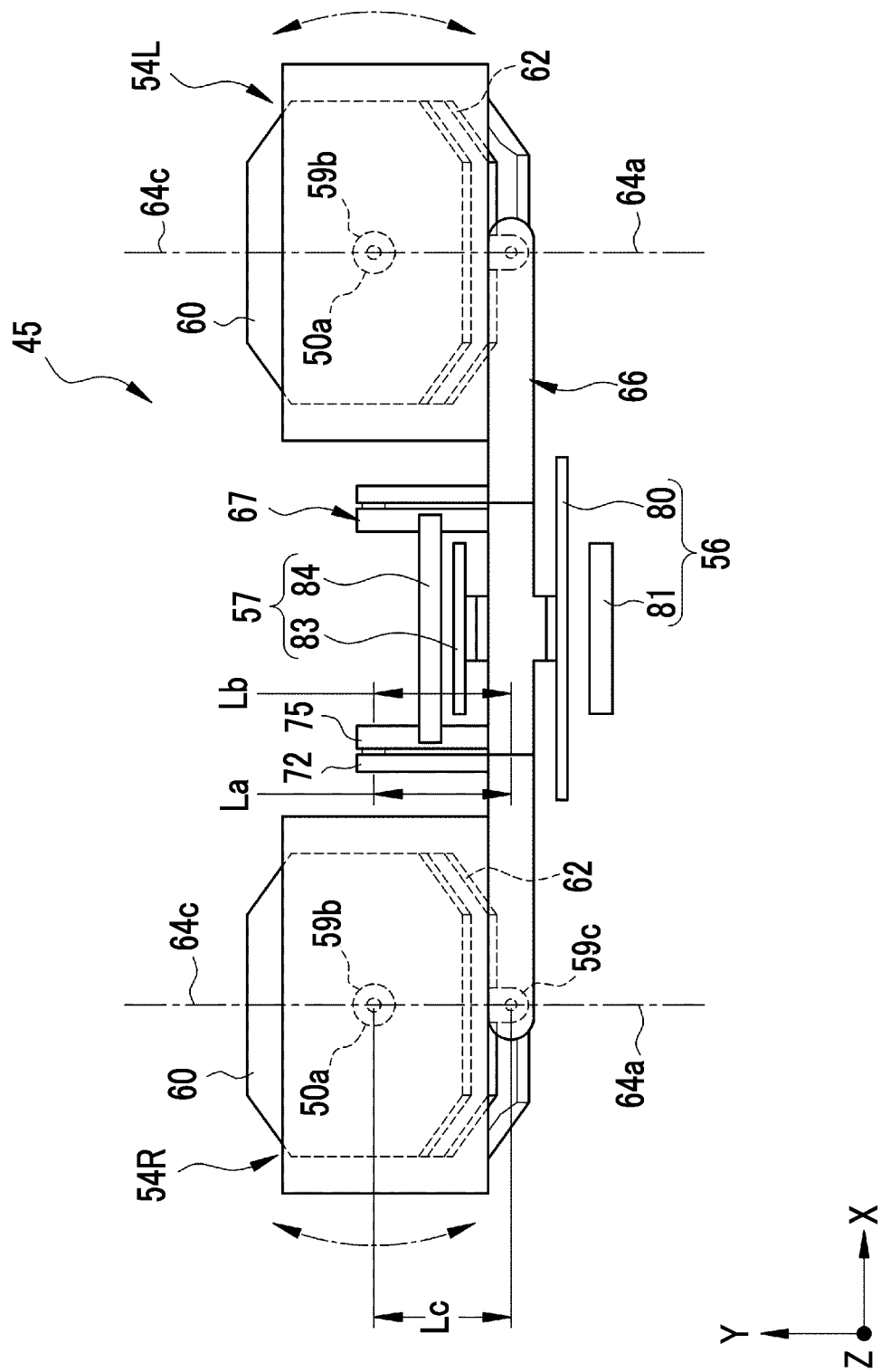
FIG. 8 is a plan view of the anti-vibration device.
Figure 9:
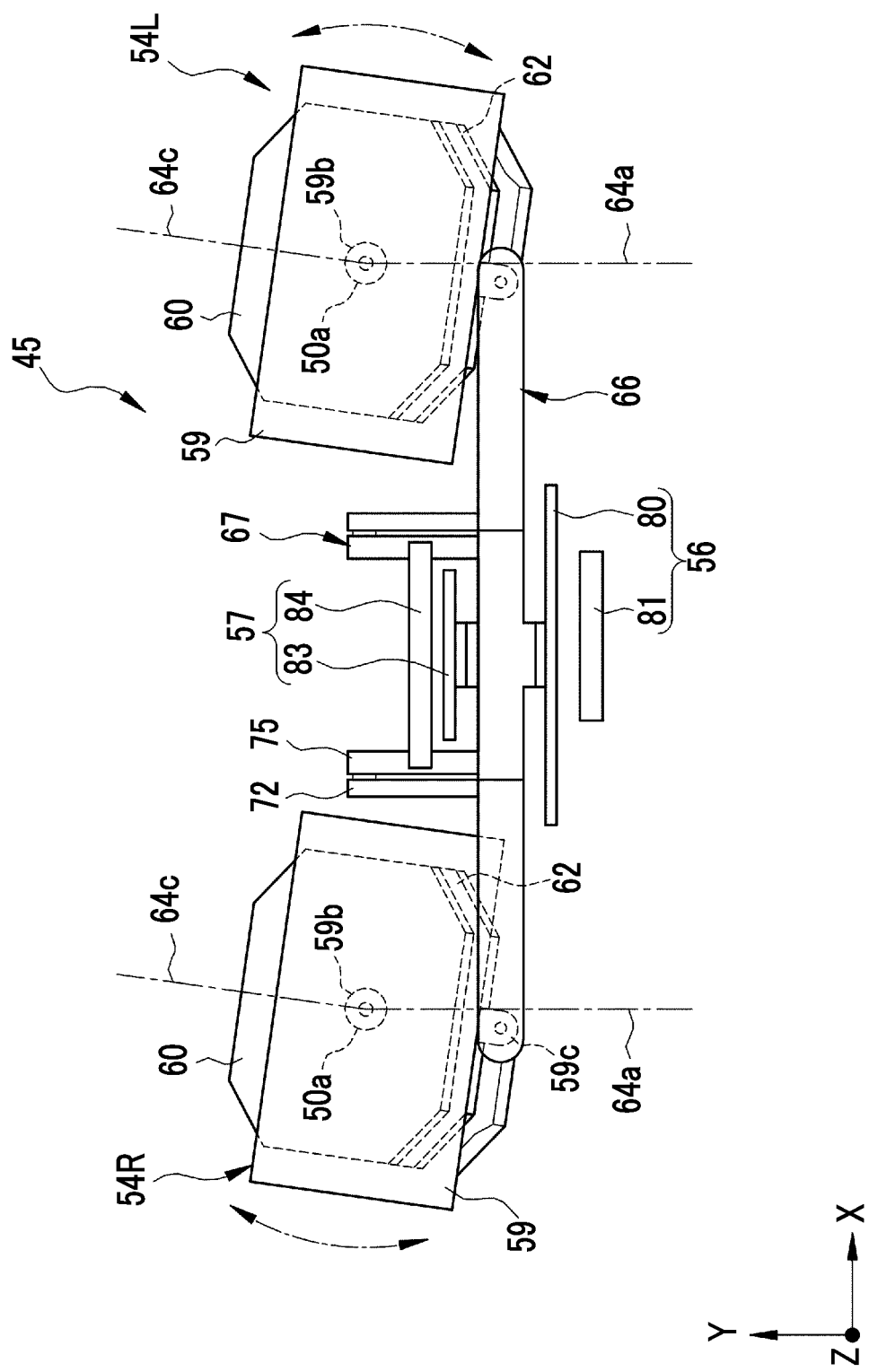
FIG. 9 is a plan view of the anti-vibration device at the time of blur correction.

As shown in FIGS. 8 and 9, the link mechanism 55 rotates the barrels 59 of the left anti-vibration unit 54L and the right anti-vibration unit 54R around the first rotational axis 11 parallel to the Z axis with the bearing bosses 59b as the centers by moving the first link member 66 along the X axis direction, that is, by moving the first link member in an arrangement direction of the barrels 59 of the left anti-vibration unit 54L and the right anti-vibration unit 54R. Thereby, the first reflective member 60 and the second reflective member 62 of the left anti-vibration unit 54L and the right anti-vibration unit 54R are respectively integrally rotated, and therefore a deflection direction of the third optical axis 64c is changed. As a result, image blurring in the yaw direction is corrected.

Figure 10:
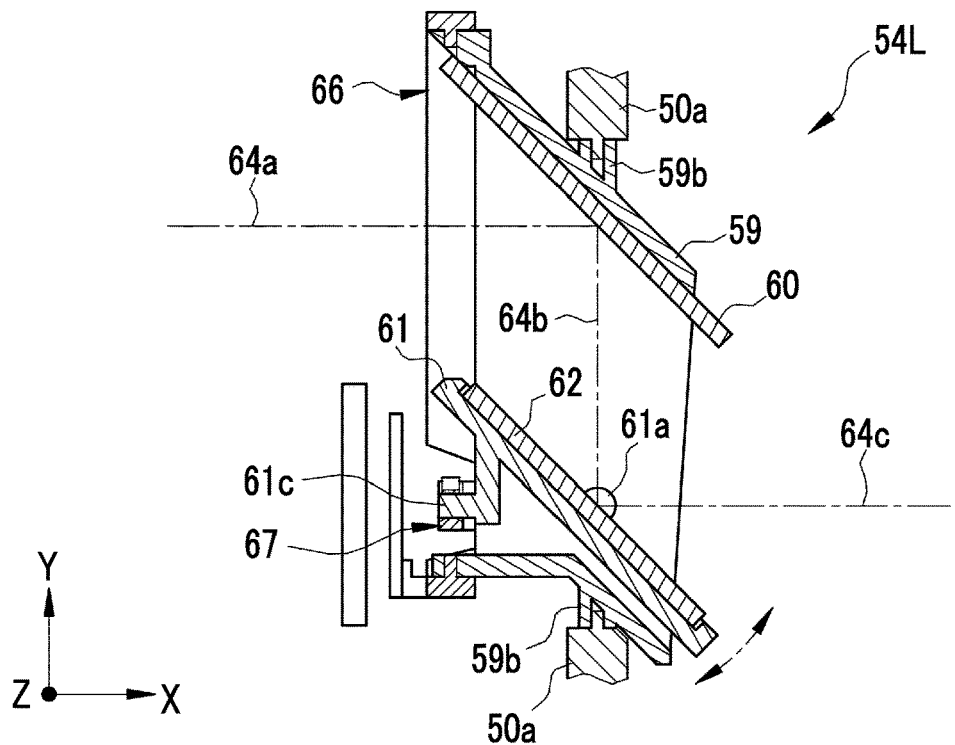
FIG. 10 is a vertical cross section view taken along a left-eye optical axis of the anti-vibration device.
Figure 11:
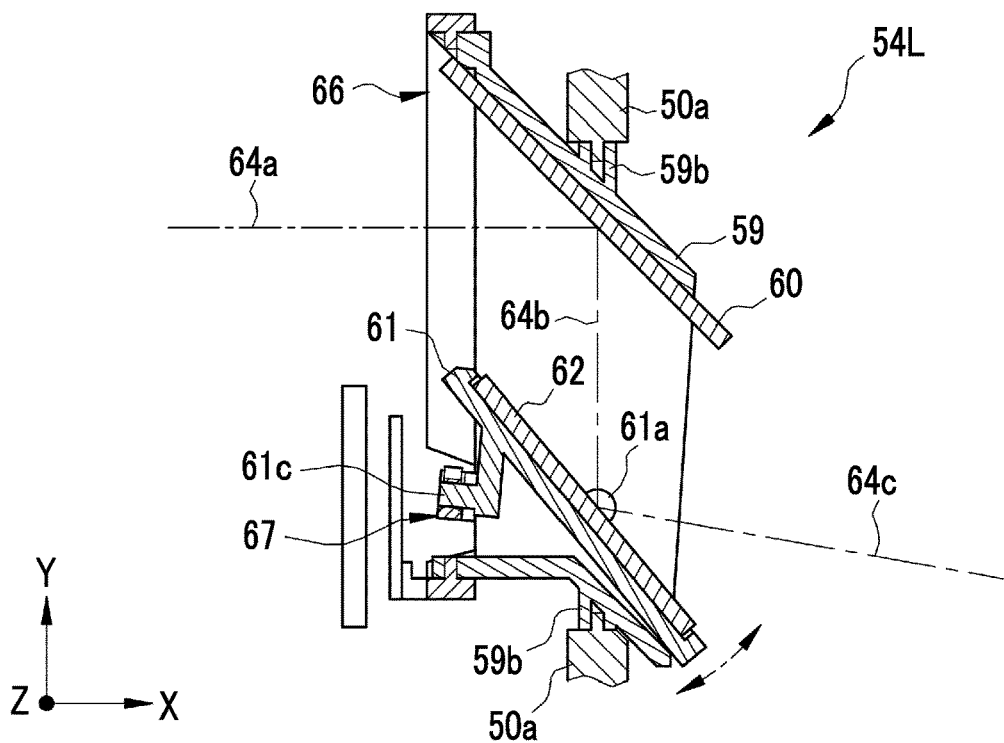
FIG. 11 is a vertical cross section view taken along the left-eye optical axis of the anti-vibration device at the time of blur correction.

Further, as shown in FIGS. 10 and 11, in a case where the second link member 67 was rotated around the connecting pins 75a (third rotational axis 13), the second reflective members 62 of the left anti-vibration unit 54L and the right anti-vibration unit 54R are respectively rotated. Therefore, the deflection direction of the third optical axis 64c is changed, and thus, image blurring in the pitch direction is corrected.

As shown in FIGS. 6 and 8, it should be noted that a length (a length from the connecting pin 69a to the connection hole 72a) La of the third bracket 72 of the first link member 66 in the Y axis direction, a length (a length from the center of the link main body 74 to the connecting pin 75a) Lb of the connecting arm 75 of the second link member 67 in the same direction, and a length Lc from the upper connection boss 59c of the barrel 59 to the bearing boss 59b are equal to each other. Accordingly, the second rotational axis 12 and the third rotational axis 13 are concentrically disposed with each other such that central lines thereof match each other. With such a configuration, the length Lc, which is a radius of rotation in a case where the anti-vibration units 54 are rotated by the first link member 66, and the lengths Lb and Lc, which are radii of rotations in a case where the first reflective members 60 are rotated by the second link member 67, are equal to each other. Therefore, in a state where the anti-vibration units 54 are rotated and inclined, rotation of the second link member 67 is possible.

Figure 12:
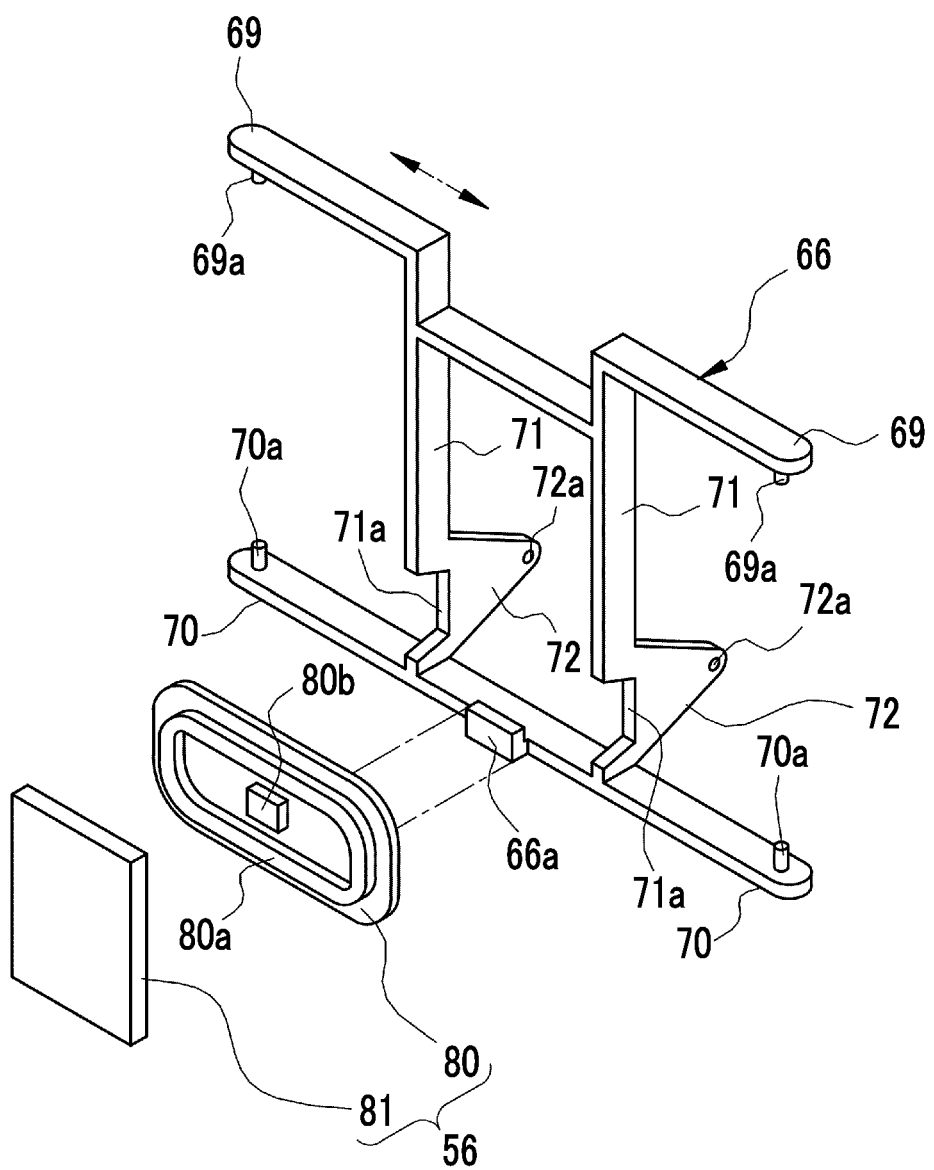
FIG. 12 is a perspective view of a first actuator.

As shown in FIG. 12, the first actuator 56 comprises a coil substrate 80 and a magnet 81. The coil substrate 80 is mounted on an attachment portion 66a of the first link member 66. The magnet 81 has a plate shape, and is fixed in the main body portion 31 so as to face the coil substrate 80. A coil 80a, around which a copper wire is wound, is provided on the coil substrate 80. The first actuator 56 is a so-called flat-coil-type voice coil motor, and drives the first link member 66 by applying current to the coil 80a and moving the coil substrate 80 in the X axis direction in magnetic field of the magnet 81. The first actuator 56 is driven, and thus, the first link member 66 moves along the X axis direction.

An X-axis position sensor 80b is provided on the coil substrate 80. The X-axis position sensor 80b measures an amount of movement of the coil substrate 80 in the X axis direction inside the coil 80a. The X-axis position sensor 80b is, for example, a magnetic sensor such as a hall element, detects magnetic field of the magnet 81, and outputs a detection signal according to an intensity of the magnetic field.

Figure 13:
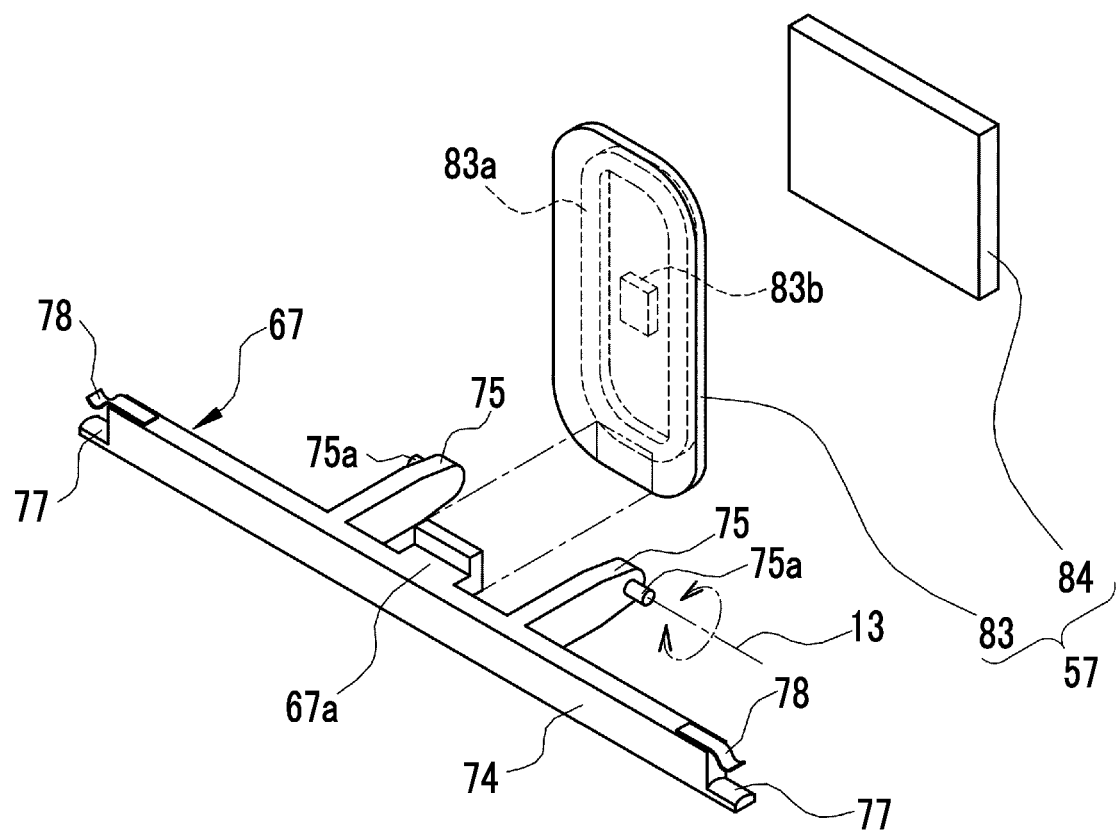
FIG. 13 is a perspective view of a second actuator.

As shown in FIG. 13, the second actuator 57 comprises a coil substrate 83 and a magnet 84. The coil substrate 83 is mounted on an attachment portion 67a of the second link member 67. The magnet 84 has a plate shape, and is fixed in the main body portion 31 so as to face the coil substrate 83. A coil 83a and a Z-axis position sensor 83b are provided on the coil substrate 83. The second actuator 57 is a voice coil motor which is the same as the first actuator 56, and drives the second link member 67 by applying current to the coil 83a and moving the coil substrate 83 in the Z axis direction in magnetic field of the magnet 84. The second actuator 57 is driven, and thus, the second link member 67 is rotated around the third rotational axis 13. The Z-axis position sensor 83b is a magnetic sensor which is the same as the X-axis position sensor 80b, and measures an amount of movement of the coil substrate 83 in the Z axis direction.

In the anti-vibration device 45, the first actuator 56 is disposed so as to be close to a lower side in the Z axis direction (upper-lower direction). Hereinafter, in the Z axis direction, a side on which the first reflective member 60 is positioned is referred to as an upper side or an upper end, and a side on which the second reflective member 62 is positioned is referred to as a lower side or a lower end. Specifically, the first actuator 56 is positioned in a position lower than an upper end surface of the second reflective member 62 in the Z axis direction. Copper wires for the first actuator 56 and the second actuator 57 are metal wires having high specific gravity, and are very heavy among the components constituting the anti-vibration device 45.

As shown in FIG. 2, the first actuator 56 and the second actuator 57 are positioned in a middle region between the left telephoto optical system 37L and the right telephoto optical system 37R. The battery 42 housed in the battery housing portion 39 is similarly positioned in the middle region between the left telephoto optical system 37L and the right telephoto optical system 37R. The middle region between the left telephoto optical system 37L and the right telephoto optical system 37R is a region which is interposed between the left telephoto optical system 37L and the right telephoto optical system 37R in the X axis direction and is positioned between the front ends of the left objective optical system 35L and the right objective optical system 35R and the rear ends of the left ocular optical system 36L and the right ocular optical system 36R in the Y axis direction.

More specifically, the first actuator 56 is positioned behind the left objective optical system 35L and the right objective optical system 35R and in front of the first reflective member 60 and the second reflective member 62 in the Y axis direction. The second actuator 57 is positioned between the pair of left first reflective member 60 and second reflective member 62 and the pair of right first reflective member and second reflective member. The battery 42 is positioned between the left objective optical system 35L and the right objective optical system 35R.

Figure 14:
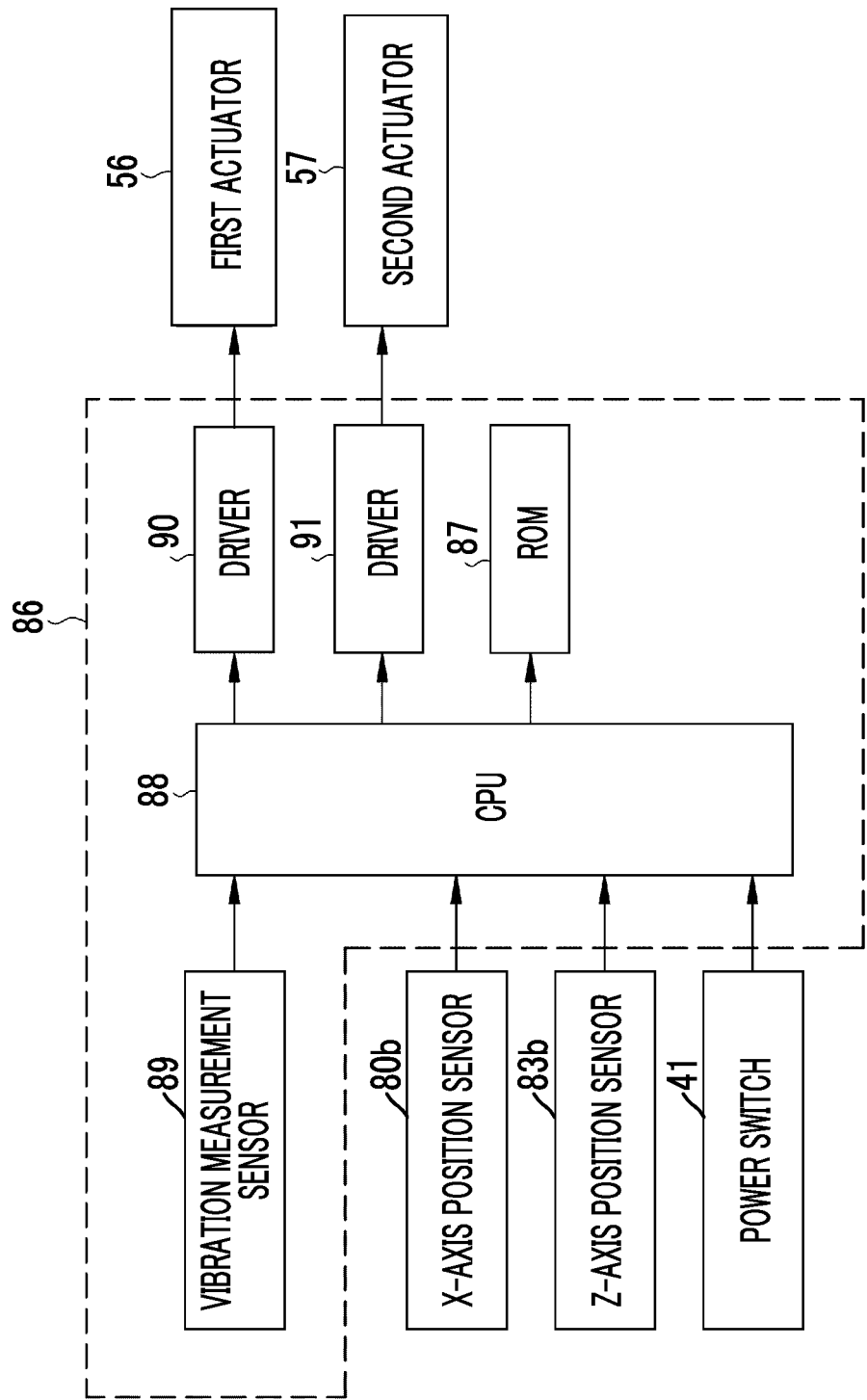
FIG. 14 is a block diagram of an anti-vibration control circuit.

As shown in FIG. 14, the anti-vibration control circuit 86 provided on the control substrate 46 includes a read only memory (ROM) 87, a central processing unit (CPU) 88, a vibration measurement sensor 89, and drivers 90 and 91. The ROM 87 stores a control program. The CPU 88 controls the anti-vibration device 45 on the basis of the control program. The vibration measurement sensor 89 measures amounts of vibration of the binocle 30 around the X and Z axes. The drivers 90 and 91 respectively drive the first actuator 56 and the second actuator 57. The CPU 88 is connected to the power switch 41, the X-axis position sensor 80b, and the Z-axis position sensor 83b.

Figure 15:
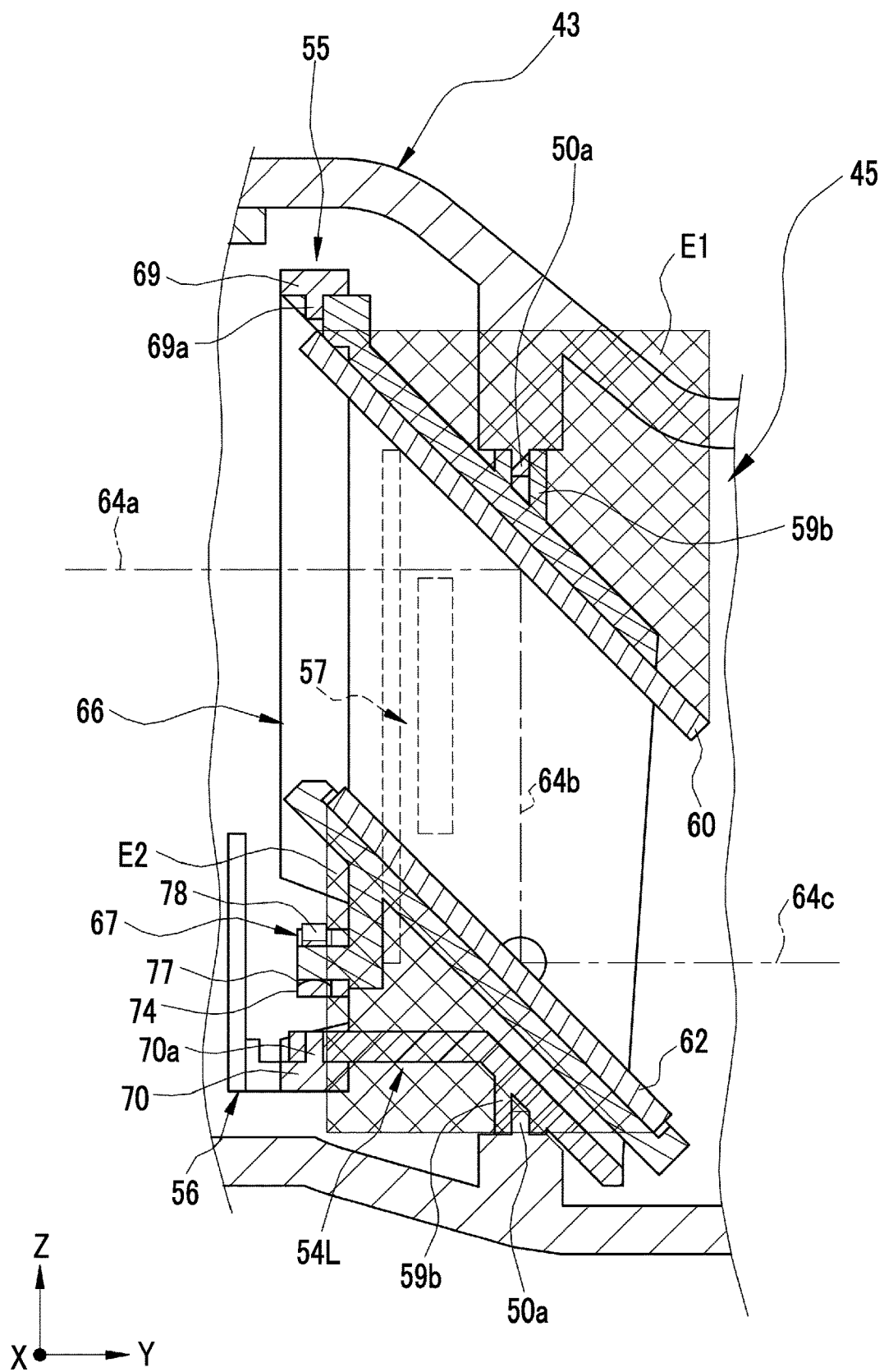
FIG. 15 is a partial enlarged cross section view for describing a triangle region on a rear side of first and second reflective members.

As shown in FIG. 15, in the anti-vibration device 45, the first link member 66 and the second link member 67 are disposed in positions on the rear side (a side opposite to the reflective surface) of the second reflective member 62. Specifically, in a case where the barrel 59 is viewed in a direction parallel to the second rotational axis 12, at least a part of the first link member 66 and the second link member 67 is disposed in a triangle region E2 (which is a hatched region represented by a mesh pattern and is region in contact with the second reflective member 62) surrounded by the second reflective member 62, a lower end surface passing through a lower end of the second reflective member 62 in the upper-lower direction, and a front end surface passing through a front end of the second reflective member 62 in the front-back direction.

More specifically, a part of the second bracket 70 of the first link member 66 is disposed in a triangle region E2. Parts of the link main body 74 and the abutment portions 77 of the second link member 67 are disposed in the triangle region E2.

Next, effects of the above-mentioned embodiment will be described. The anti-vibration control circuit 86 starts actuation through an ON operation of the power switch 41. The vibration measurement sensor 89 detects vibration of the binocle 30 around the X and Z axes, and outputs the detection signal to the CPU 88. The CPU 88 controls the drivers 90 and 91 on the basis of the detection signal of the vibration measurement sensor 89 and the position information of the coil substrate 80 and the coil substrate 83 detected by the X-axis position sensor 80b and the Z-axis position sensor 83b, and drives the first actuator 56 and the second actuator 57 so as to correct image blurring of an optical image.

In a case where image blurring in the pitch direction occurs in the binocle 30, the CPU 88 moves the coil substrate 83 of the second actuator 57 in the Z axis direction. The second link member 67 is rotated around the connecting pins 75a of the connecting arms 75 due to the movement of the coil substrate 83. The second reflective members 62 of the left anti-vibration unit 54L and the right anti-vibration unit 54R are rotated around the X axis with the rotation pins 61a as the centers due to the rotation. Thereby, the deflection direction of the third optical axis 64c is changed, and thus image blurring in the pitch direction is corrected.

Further, in a case where image blurring in the yaw direction occurs in the binocle 30, the CPU 88 moves the coil substrate 80 of the first actuator 56 in the X axis direction. The first link member 66 moves in the X axis direction due to the movement of the coil substrate 80. The respective barrels 59 of the left anti-vibration unit 54L and the right anti-vibration unit 54R is rotated around the Z axis with the bearing bosses 59b as the centers due to the movement. Accordingly, since the first reflective members 60 and the second reflective members 62 of the left anti-vibration unit 54L and the right anti-vibration unit 54R are integrally rotated and the deflection direction of the third optical axis 64c is changed, image blurring in the yaw direction is corrected.

In a case where image blurring in the pitch direction and the yaw direction occurs in the binocle 30, the CPU 88 drives the first actuator 56 and the second actuator 57. Accordingly, the first reflective members 60 and the second reflective members 62 of the left anti-vibration unit 54L and the right anti-vibration unit 54R are integrally rotated around the Z axis while rotating the second reflective members 62 of the left anti-vibration unit 54L and the right anti-vibration unit 54R around the X axis. Even in such a case where mixed image blurring is corrected, the first reflective member 60 and the second reflective member 62 are integrally rotated. Therefore, an optical image is prevented from rotating around the optical axis.

According to the anti-vibration device 45 of the present embodiment, since at least a part of the first link member 66 and the second link member 67 is disposed in the region E2 on the rear side of the second reflective member 62 inclined with respect to the Y axis direction, it is possible to reduce a size of the anti-vibration device 45 by suppressing a dimension of the anti-vibration device in the upper-lower direction.

In the anti-vibration device 45, the first actuator 56 is disposed so as to be close to the lower side in the Z axis direction (upper-lower direction). Since the first actuator 56 which is the heavy component among the components constituting the anti-vibration device 45 is disposed so as to be close to the lower side, the center of gravity is stable, and thus, it is possible to reduce hand shaking of the binocle 30.

Furthermore, since the first actuator 56, the second actuator 57, and the battery 42 are disposed in the middle region between the left telephoto optical system 37L and the right telephoto optical system 37R, it is possible to reduce hand shaking in a left-right direction of the binocle 30.

Although it has been described in the embodiment that the first link member 66 and the second link member 67 are disposed on the rear side of the second reflective member 62, the present invention is not limited thereto. The first link member 66 and the second link member 67 may be disposed on the rear side (the side opposite to the reflective surface) of the first reflective member 60. Specifically, in a case where the barrels 59 are viewed in the direction parallel to the second rotational axis 12, at least a part of the first link member 66 and the second link member 67 may be disposed in the triangle region E1 (which is a region represented by a mesh pattern and is a region in contact with the first reflective member 60 in FIG. 15) surrounded by the first reflective member 60, the upper end surface passing through the upper end of the first reflective member 60 in the upper-lower direction, and the rear end surface passing through the rear end of the first reflective member 60 in the front-back direction. Therefore, it is possible to acquire the same effects as those in the embodiment.

Figure 16:
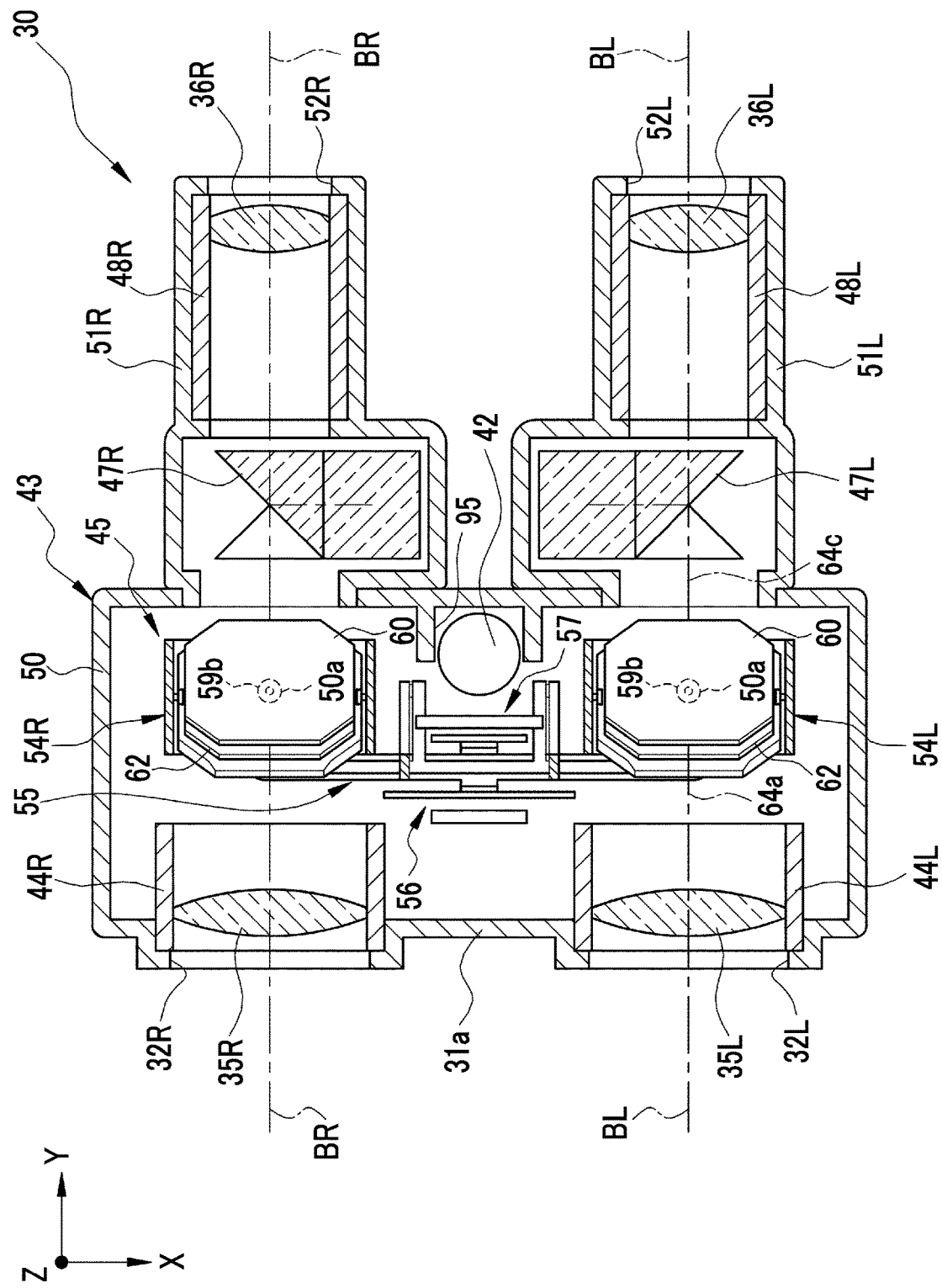
FIG. 16 is a horizontal cross section view showing a modification example in which a battery is disposed between the first and second reflective members.

Although it has been described in the embodiment that the battery 42 is disposed between the left objective optical system 35L and the right objective optical system 35R on the rear side of the front surface 31a of the main body portion 31, the present invention is not limited thereto. The battery housing portion 95 may be provided in a position behind the position described in the embodiment, for example, in a position between the pair of left first reflective member 60 and second reflective member 62 and the pair of right first reflective member and second reflective member, that is, behind the second actuator 57, and the battery 42 may be housed in the battery housing portion 95, as in a modification example shown in FIG. 16. Accordingly, since the first actuator 56, the second actuator 57, and the battery 42 which are the heavy components are intensively disposed near the first reflective members 60 and the second reflective members 62, the center of gravity is stable, and thus, it is possible to prevent hand shaking in the front-back direction.

Although it has been described in the embodiment that the battery 42 has the cylinder shape, the present invention is not limited thereto. The battery may have a rectangular shape or other shapes.

Although it has been described in the embodiment that the first actuator 56 is disposed so as to be close to the lower side in the Z axis direction, the present invention is not limited. At least one of the first actuator 56 or the second actuator 57 may be disposed so as to any one side in the Z axis direction.

Although it has been described in the embodiment that the first reflective member is inclined at an angle of 45° with respect to the first optical axis of the objective optical system, and the second optical axis is deflected at an angle of 90° with respect to the first optical axis, an angle formed by the first optical axis and the second optical axis may be smaller or greater than 90°. Further, in a case where the first reflective member and the second reflective member are integrally rotated, the second optical axis is used as a rotational axis thereof, but is not limited to this. For example, the second optical axis may be freely selected if the axis is an axis that passes through the intersection between the first optical axis and the reflective surface of the first reflective member and is included in a plane formed by the first optical axis and the second optical axis.

Although it has been described in the embodiment that the first reflective members 60 are fixed to the barrels 59 and the second reflective member 62 is fixed to and held by the holding plate 61 so as to be rotatable, the second reflective members 62 may be fixed to the barrels 59, and the first reflective members may be held through the holding plate so as to be rotatable.

In the above-mentioned embodiment, a surface reflection mirror was used as the reflective member, but a prism of which the rear surface is reflective may be used as the reflective member. Furthermore, in the description of each embodiment, in order to show a positional relationship between a plurality of optical axes, a certain term such as a right angle or parallelism is used as a specific numerical angle such as 45° or 90°. However, those include tolerances according to accuracies required in an optical system.

EXPLANATION OF REFERENCES

11 first rotational axis
12 second rotational axis
13 third rotational axis
30 binocle
31 main body portion
31*a* front surface
32L left objective opening
32R right objective opening
33L left eyepiece portion
33R right eyepiece portion
35L left objective optical system
35R right objective optical system
36L left ocular optical system
36R right ocular optical system
37L left telephoto optical system
37R right telephoto optical system
39 battery housing portion
40 adjusting knob
41 power switch
42 battery
43 casing
44L left objective barrel
44R right objective barrel
45 anti-vibration device
46 control substrate
47L left erecting optical system
47R right erecting optical system
48L left eyepiece barrel
48R right eyepiece barrel
50 casing main body
50*a* bearing pin
51L left eyepiece casing
51R right eyepiece casing
52L left eyepiece opening
52R right eyepiece opening
53 main body casing
54 anti-vibration unit
54L left anti-vibration unit
54R right anti-vibration unit
55 link mechanism
56 first actuator
57 second actuator
59 barrel
59*a* bearing hole
59*b* bearing boss
59*c* upper connection boss
59*d* lower connection boss
60 first reflective member
61 holding plate
61*a* rotation pin
61*b* bracket
61*c* connecting pin
62 second reflective member
64*a* first optical axis
64*b* second optical axis
64*c* third optical axis
66 first link member
66*a* attachment portion
67 second link member
67*a* attachment portion
69 first bracket
69*a* connecting pin
70 second bracket
70*a* connecting pin
71 pair of connecting portions
71*a* notch
72 third bracket
72*a* connection hole
74 link main body
75 connecting arm
75*a* connecting pin
77 abutment portion
77*a* abutment surface
78 urging member
80 coil substrate
80*a* coil
80*b* axis position sensor
81 magnet
83 coil substrate
83*a* coil
83*b* axis position sensor
84 magnet
86 anti-vibration control circuit
87 ROM
88 CPU 89 vibration measurement sensor
90 driver
91 driver
95 battery housing portion
BL left-eye optical axis
BR right-eye optical axis
E1, E2 region
La, Lb, Lc length

What is claimed is:

1. An anti-vibration device that is disposed between a pair of left and right objective optical systems of which optical axes are disposed in parallel with each other and a pair of left and right ocular optical systems of which optical axes are disposed in parallel with each other, the objective systems and the ocular optical systems constituting a pair of left and right telephoto optical systems, the device comprising:
   a pair of left and right first reflective members that is disposed so as to be respectively inclined with respect to first optical axes of the objective optical systems, and forms second optical axes by deflecting the first optical axes of the pair of left and right objective optical systems;
   a pair of left and right second reflective members that is disposed so as to be respectively inclined with respect to the second optical axes, and forms third optical axes parallel to the first optical axes by deflecting the second optical axes;
   a pair of left and right holding members that each holds the first reflective member and the second reflective member, and is disposed so as to be respectively rotated around first rotational axes concentric with the second optical axes, the pair of left and right holding members each holding one of the first reflective member and the second reflective member in a fixed state, and each holding the other one so as to be rotated around a second rotational axis perpendicular to a plane formed by the first optical axis and the second optical axis;
   a first link member that aligns the pair of left and right holding member in a state in which the first optical axes are held in parallel with each other, and rotates the holding members around the first rotational axes;
   a first actuator that moves the first link member in an arrangement direction of the holding members;
   a second link member that is held by the first link member so as to be rotated around a third rotational axis parallel to the second rotational axis, engages with the pair of left and right other reflective members, and rotates the other reflective members;
   a second actuator that rotates the second link member around the third rotational axis,
   wherein, in a case where a direction parallel to the second optical axis is an upper-lower direction, a direction parallel to the first and third optical axes is a front-back direction, and the holding member is viewed in a direction parallel to the second rotational axis, at least a part of the first and second link members is disposed in a triangle region surrounded by the first reflective member, an upper end plane passing through an upper end of the first reflective member in the upper-lower direction and being parallel to the front-back direction, and a rear end plane passing through a rear end of the first reflective member in the front-back direction and being parallel to the upper-lower direction, or a triangle region surrounded by the second reflective member, a lower end plane passing through a lower end of the second reflective member in the upper-lower direction and being parallel to the front-back direction, and a front end plane passing through a front end of the second reflective member in the front-back direction and being parallel to the upper-lower direction; and
   a processor configured to drive the first actuator and the second actuator based on amounts of vibration of the objective optical systems measured by a vibration measurement sensor.

2. The anti-vibration device according to claim 1, wherein at least one of the first actuator or the second actuator is disposed so as to be close to an upper side or a lower side of the objective optical systems in the upper-lower direction.

3. The anti-vibration device according to claim 1, wherein the first actuator and the second actuator are positioned in a middle region between the pair of left and right telephoto optical systems.

4. The anti-vibration device according to claim 1, wherein the second link member rotates the pair of left and right second reflective members.

5. The anti-vibration device according to claim 1, further comprising:
   a battery that serves as a power supply of the first actuator and the second actuator,
   wherein the battery is positioned in a middle region between the pair of left and right telephoto optical systems.

6. The anti-vibration device according to claim 1, wherein the first actuator and the second actuator are voice coil motors each having a magnet and a coil, and the coil of the first actuator is fixed to the first link member, and the coil of the second actuator is fixed to the second link member.

7. A binocle comprising:
   objective optical systems each having a positive composite focal length,
   ocular optical systems; and
   the anti-vibration device according to claim 1 provided between the objective optical systems and the ocular optical systems.

8. The binocle according to claim 7, wherein the ocular optical systems each have a positive composite focal length, and erecting optical systems that invert an optical image in vertical and horizontal directions are provided between the anti-vibration device and the ocular optical systems.

* * * * *